UNITED STATES PATENT OFFICE 2,398,442

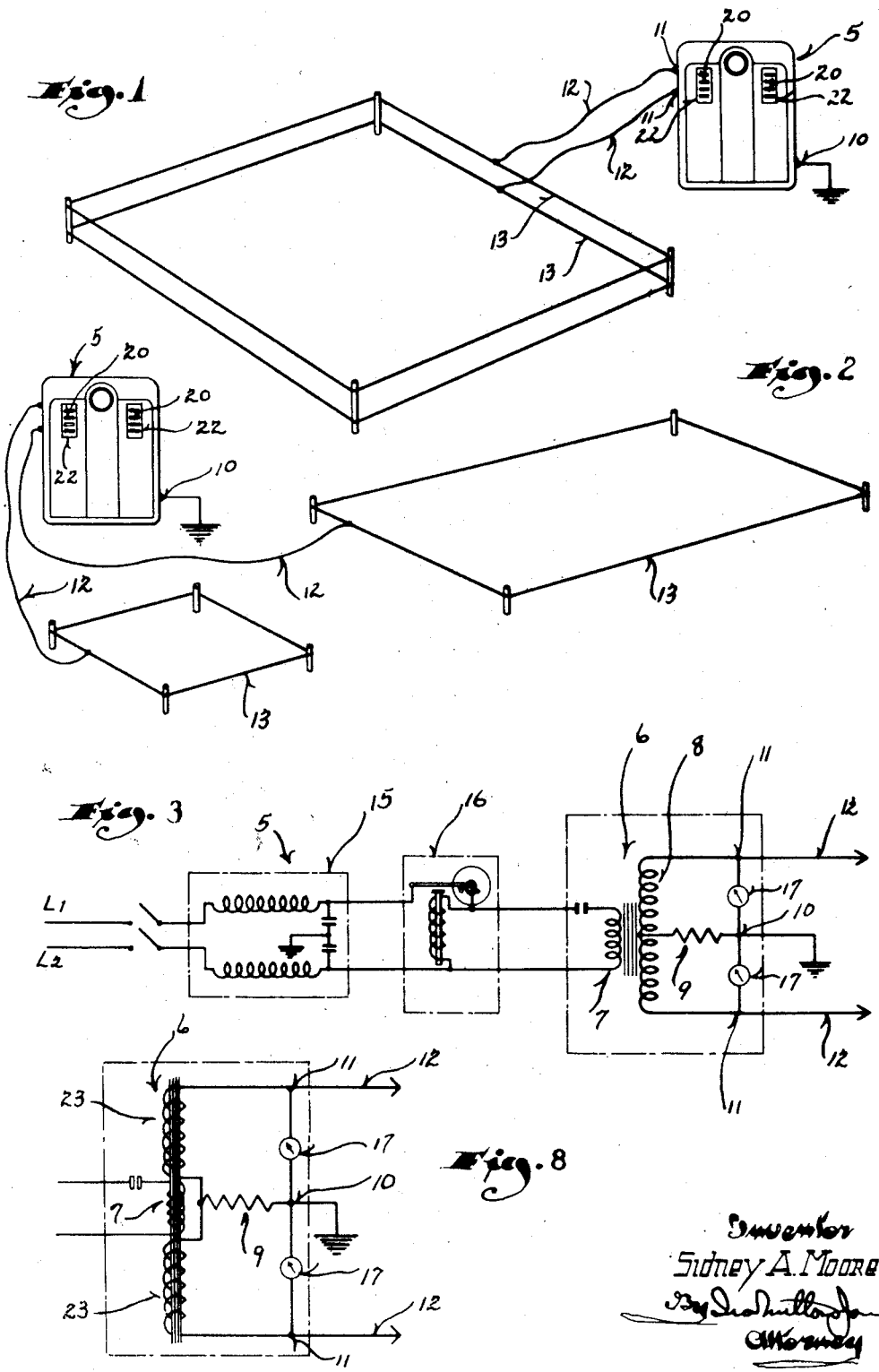

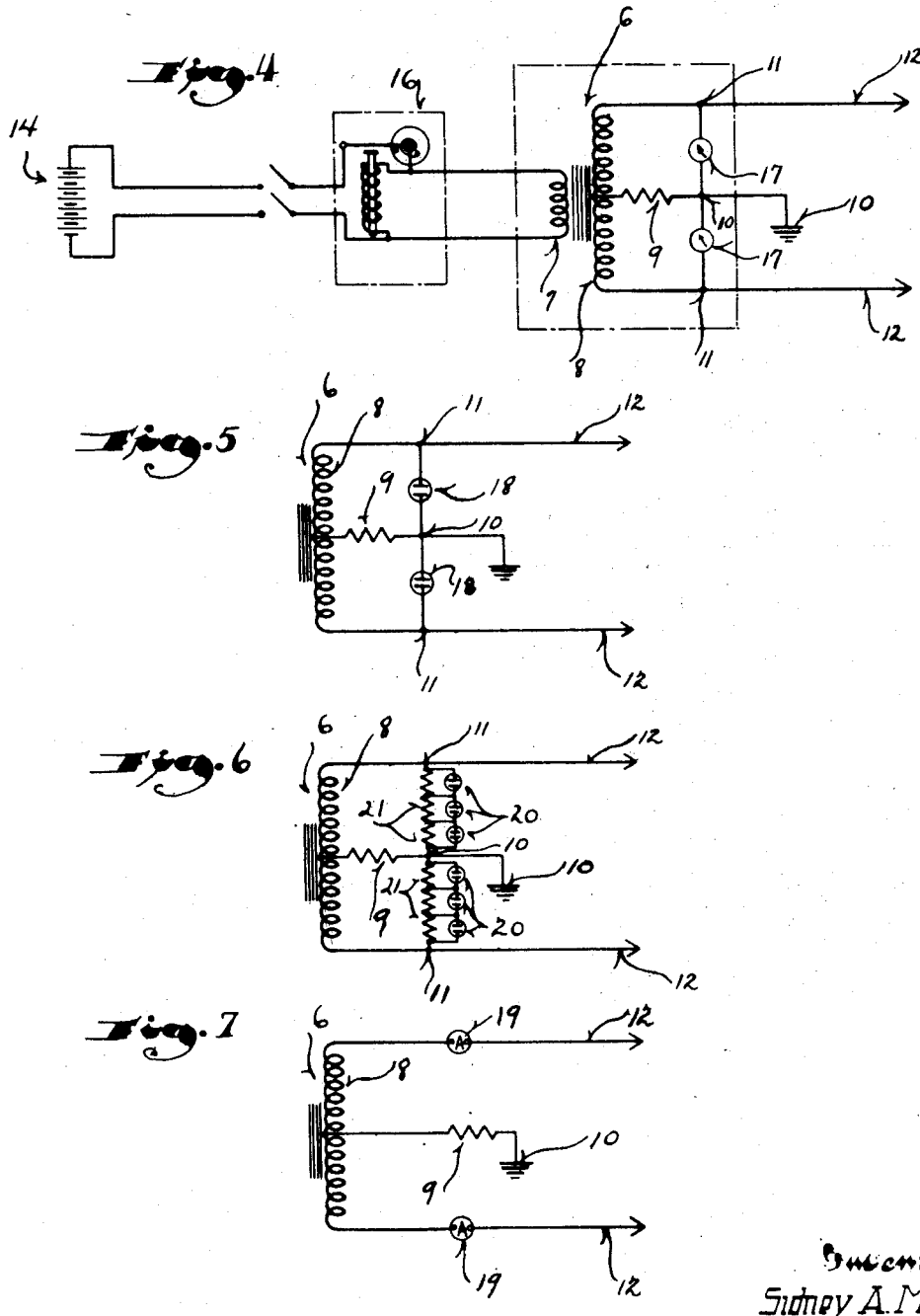

MULTIPLE WIRE ELECTRIC FENCE

Sidney A. Moore, Milwaukee, Wis., assignor to The Prime Manufacturing Company, Milwaukee, Wis., a corporation of Wisconsin Application October 9, 1944, Serial No. 557,923

2 Claims. (Cl. 256—10)

This invention relates to electric fencing and has as a general object the provision of an electric fence not subject to limitations inherent in electric fences of the past.

As is well known to users of electric fencing, it is often necessary to employ two or more parallel wires in the fence with the wires spaced different distances from the ground. Such multiple wire fences are required when different sized animals are confined in the same enclosure, and also in the fencing of long haired animals such as sheep and goats.

In electric fences heretofore in use, whenever such parallel fence wires were employed, the wires were either connected in series so that at no time was there a shock between wires, or the lower wire was grounded. This provided a shock between wires but no shock from the lower wire to ground. Also, where the two wires were connected in series partial or complete grounding of the bottom wire caused by short grass growth or other reasons, made the entire fence ineffective.

It is also often desirable to fence two separate fields or groups of fields from the same controller, but with the conventional electric fences of the past, a ground on any part of either fence rendered the entire system ineffective. This alone was highly objectionable, but, in addition, locating the ground presented a difficult problem.

The present invention overcomes these deficiencies of past electric fences by providing means for independently energizing two wires in such a way that the grounding of one wire does not render the other ineffective to give a shock, and that when the two wires are used in one fence a shock may be had from wire to wire as well as from either wire to ground.

To this end it is an object of the present invention to provide an electric fence controller incorporating a transformer of special design with a split secondary, each of which is designed to energize a separate fence circuit and with both secondary sections connected to ground through a current limiting resistor of such value as to effect a voltage drop when one or the other fence circuit is grounded of such proportions that the remaining ungrounded fence circuit continues to function.

While signals in an electric fence controller are of course not new, it is a generally accepted fact by those skilled in the art that an electric fence controller not equipped with signals is but partially satisfactory. It is, therefore, a further object of this invention to provide an independent signal in each fence circuit for individually indicating the condition of each of the two fence circuits energized by the controller.

With the above and other objects in view, which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawings illustrate several complete examples of the physical embodiment of the invention constructed in accordance with the best modes so far devised for the practical application of the principles thereof, and in which:

Figure 1 is a view diagrammatically illustrating the application of this invention to an electric fence in which two parallel wires insulated from each other and from ground are used to fence one enclosure;

Figure 2 is a view diagrammatically illustrating the application of this invention to the fencing of two separate enclosures;

Figure 3 illustrates the circuit of the controller of this invention when used on so-called high-line operation;

Figure 4 is a view similar to Figure 3, but illustrating the application of this invention to a battery type controller;

Figures 5, 6, and 7 are views showing part of the circuit and illustrating different types of indicating means for depicting the effectiveness of the charges on the separate fence wires; and Figure 8 is a view of part of the circuit and showing a slightly modified form of transformer construction.

Referring now particularly to the accompanying drawings, the numeral 5 indicates a controller, the mechanism of which is housed within a suitable casing. Included in the controller mechanism is a high leakage transformer 6 having a primary 7 and a secondary 8. The secondary is split and grounded at its center tap through a current limiting resistor 9 connected to a ground terminal 10.

The center tapped arrangement of the secondary thus divides the secondary into two sections or windings, one end of each of which is grounded through the current limiting resistor 9 and the other "hot" end of which is connected to a fence terminal 11. The fence terminals 11 are adapted to have lead wires 12 attached thereto by which each terminal is connected to a fence wire 13.

These are, therefore, two separate fence circuits.

The two secondary sections are so balanced that the open circuit voltage across each section is substantially half the voltage across the entire secondary; and the value of the resistor 9 is such that it will limit the current flowing in a closed fence circuit (established by grounding of its fence wire) to approximately half the value that would obtain in the absence of the resistor. This assures the other ungrounded fence circuit remaining effective.

The fence wires 13 may be arranged in parallel, as shown in Figure 1, to form one fence or, as shown in Figure 2, each wire may be used to fence in a separate enclosure.

The primary 7 of the transformer is adapted to be periodically energized from a power source which, in Figure 3, is represented by commercial power lines L1, L2, and, in Figure 4, by a battery 14.

In the high-line type controller, shown in Figure 3, the power for energizing the primary passes through a control unit 15 which embodies current limiting means, a radio interference filter and an automatic cutout shown and described in Reissue Patent No. 22,143, issued July 21, 1942, to John E. Vaughan for Electric fence.

Also incorporated in the controller is a timing device 16 by which the current to the primary is periodically made and broken. The specific construction of this timing device forms no part of the present invention and may be any suitable mechanism capable of periodically interrupting the primary circuit.

Indicating means are provided for depicting the condition of the fence or, in other words, the effectiveness of the charge on each of the two fence wires. This indicating means may consist of a voltmeter 17, as shown in Figures 3 and 4, connected between ground and each of the two fence terminals; two separate glow lamps 18 similarly connected, as shown in Figure 5; or an ammeter 19 connected in each fence circuit, as shown in Figure 7.

However, the preferable form of indicating means is as illustrated in Figure 6. Here a plurality of glow lamps 20 are connected in series between ground and each fence terminal and suitable resistance 21 is connected across each lamp. Thus, when the charge on each of the two fence wires is at maximum effectiveness all of the glow lamps flash concomitantly with the periodic energization of the transformer. In the event of a short from fence wire to fence wire the flashing of all of the lamps is interrupted, but in the case of ground occurring on one fence circuit all or part of the lights in that circuit will remain out and thereby indicate the degree of ineffectiveness. A slight ground prevents the flashing of one light in the bank. A better ground connection causes another light of the bank to remain out, and so on, until in the case of a dead ground all of the lights remain out.

The banks of glow lamps for the two fence circuits are preferably arranged in separate panels 22 on the front of the casing, one at each side thereof, as indicated in Figures 1 and 2.

From the description thus far it will be evident that this invention provides an electric fence wherein two separate fence wires may be simultaneously energized from a single controller in such a way that a ground on one wire does not result in the loss of effectiveness of the charge on the other wire and in addition a shock may be had from wire to wire. Thus, if the two wires energized by the controller are arranged in parallel one above the other as a single fence, the loss in effectiveness of the bottom wire due to short growth reaching it, does not render the top wire ineffective as an electric fence.

This desirable result follows from the fact that by virtue of the specific circuit arrangement employed and particularly the provision of the resistor with its stated current limiting characteristics in the ground connection to the center tap of the transformer secondary, a separate shock circuit is provided for each wire with twice the voltage between the two circuits as from either circuit to ground.

Merely for purposes of illustration and not in anywise as a limitation, the values of a typical controller constructed in accordance with this invention are given as follows:

A current limiting resistor of 1750 ohms.

A high leakage transformer having a primary winding designed for 120 volts, 60 cycle A. C. and a secondary designed to provide the following:

| | |
|---|---:|
| Open circuit voltage across the entire secondary winding_____volts__ | 2600 |
| Open circuit voltage of each section of the center tapped secondary_____do____ | 1300 |
| Short circuit current across the entire secondary _____milliampere__ | 29 |
| Short circuit current across either section of the secondary _____do____ | 52 |
| Voltage drop from either "hot" end of the secondary to ground while the other section of the secondary is grounded__volts__ | 1250 |
| Voltage from either "hot" end of the secondary to its center tap while the opposite "hot" end of the secondary is grounded _____do____ | 690 |
| Current from either "hot" end of the secondary to ground _____milliampere__ | 34 |

While the conventional transformer construction is satisfactory, it has been found that the arrangement of the windings illustrated in Figure 8 affords somewhat better results from the standpoint of balance between the two fence circuits. In this case the two sections 23 of the secondary are arranged at opposite ends of the transformer core one on each side of the primary winding 7. In other respects, however, the circuit of the embodiment shown in Figure 8 is the same as that described.

From the foregoing description, taken in connection with the accompanying drawings, it will be readily apparent to those skilled in the art that this invention provides an electric fence which is not subject to some of the chief deficiencies of electric fences heretofore in use.

What I claim as my invention is:

1. An electric fence comprising: two separate fence wires; a transformer having a continuous core with a primary and a secondary wound thereon, the secondary having a center tap with substantially an equal number of turns on each side of the tap so that the open circuit voltage across the entire secondary is approximately twice the open circuit voltage across each section thereof and the short circuit current directly across the entire secondary is approximately half the short circuit current directly across each section of the secondary; means for periodically energizing the primary to periodically induce a potential in the secondary; means for connecting one outer end of the secondary with one fence wire; means for connecting the other outer end of the secondary with the other fence wire; and a current limiting resistor connected between the center tap on the secondary and ground, said current limiting resistor having a value such that the voltage drop thereacross upon the grounding of one fence wire maintains effective operating voltage on the other fence wire as a result of reducing the current through the grounded fence wire to a value materially lower than the short circuit current directly across either of the two secondary sections.

2. An electric fence comprising: two separate fence wires; a transformer having a continuous core with a primary and a dual section secondary wound thereon; means for periodically energizing the primary to periodically induce a potential in the secondary sections; means including a current limiting resistor connecting one end of each secondary section with ground; means connecting the other end of each secondary section with one of the fence wires, said resistor having a value to reduce the current flowing in the circuit established by the grounding of one fence wire to substantially the short circuit current across the entire secondary; and a separate indicating means connected between the grounded end of the current limiting resistor and the live end of each secondary section for indicating the effectiveness of the charges on said fence wires.

SIDNEY A. MOORE.